Dec. 16, 1969     H. NEUMANN     3,484,839
METHOD OF PRODUCING CRINKLY CORRUGATIONS IN A SHEET OF
SYNTHETIC PLASTIC MATERIAL
Original Filed March 9, 1966     3 Sheets-Sheet 1

United States Patent Office 3,484,839
Patented Dec. 16, 1969

3,484,839
METHOD OF PRODUCING CRINKLY CORRUGATIONS IN A SHEET OF SYNTHETIC PLASTIC MATERIAL
Heinz Neumann, Geibelstrasse 38, Bremen, Germany
Continuation of application Ser. No. 533,005, Mar. 9, 1966. This application Nov. 15, 1968, Ser. No. 776,279
Claims priority, application Germany, Mar. 10, 1965, N 26,352
Int. Cl. B31f 1/12, 1/20; B29c 17/00
U.S. Cl. 264—282
1 Claim

ABSTRACT OF THE DISCLOSURE

A method of creping or crinkly corrugating synthetic plastics sheet material by heating a narrow transverse zone of the continuously advancing sheet for producing successive individual creping corrugations from the portions of the material softened by said heating. The formation of the individual corrugations is effected by causing the sheet to buckle at the heating zone.

---

This application is a continuation of Ser. No. 533,005, filed Mar. 9, 1966, and now abandoned.

This invention relates to a method of creping or producing crinkly corrugations in a sheet or foil of synthetic plastics material.

Articles produced from the inventive product have a great variety of uses, notably due to their decorative effect which is superior to articles for similar purposes produced from pleated plastics materials.

An object of the invention is to provide a method for the purpose indicated which is simpler, more efficient and less expensive than similar prior art methods.

Another object of the invention is to provide a method of the kind indicated using sheet material having a longitudinal dimension and a transverse dimension, comprising the steps of advancing said sheet continuously in the longitudinal direction in contact with a stationary support means, applying heat to consecutive transverse zones of said sheet as they pass a restricted transverse area of said stationary support means, thereby successively softening said sheet zones each of which has a width in the longitudinal direction of the sheet substantially corresponding to the width of one of said corrugations, reducing the rate of advancement of the portion of the sheet forwardly of said restricted transverse area by applying a localized braking action to the sheet along a transverse area thereof immediately forwardly of said restricted area thereby causing the sheet to buckle away from the support means in said area to form a transverse corrugation which sets upon cooling, and discontinuing said localized braking action while maintaing said reduced rate of advancement of said forwardly portion of the sheet so as to cause repetition of the buckling effect as each of said consecutive transverse zones of the sheet passes through said restricted transverse area.

Further objects and advantages will be apparent from the following description in conjunction with the accompanying drawings, in which.

Figure 1:
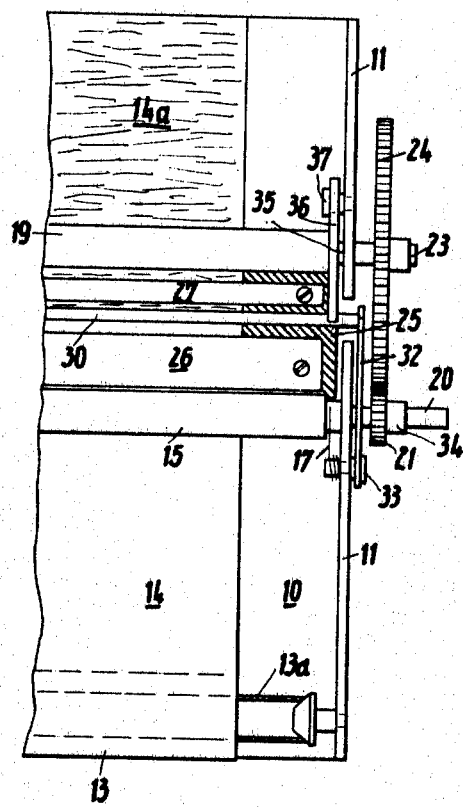
FIGURE 1 is a plan view, with parts broken away, of a machine for creping plastics foils in accordance with the invention.

Referring to FIGURE 1, the machine in accordance with the present invention comprises a frame 10 having two vertical side members 11, of which only the one on the drive side is shown in FIGURE 1. Ends 13a of a supply reel 13 of a foil 14 to be creped, and the ends of two spaced-apart pairs of rollers which extend parallel to the reel 13, are rotatably mounted either in the side members 11 or in members secured thereto. For the sake of clarity in the drawings, all that can be seen of the plastics foil in FIGURE 1 is the smooth part 14 between the reel 13 and the creping station and the creped part 14a leaving the creping station. The first pair of rollers form in this embodiment a relatively fast-running device for advancing the foil 14 to be creped and comprise a bottom driven roller 16 and a top roller 15 which is driven by engagement with roller 16 or the moving foil 14. Preferably, the mounting of the top roller 15 is such that the same either rests by its own weight on, or is biased by a spring 17 against, the bottom roller 16 or the foil 14 between the two rollers. The second roller pair forms one of the foil-delaying elements and comprises a bottom roller 18, which is preferably disposed in the same plane as the driven roller 16, and a freely rotatable top roller 19; the distance between the latter and the bottom roller 18 is adjustable. The two bottom rollers 16 and 18 are driven by a common drive means (not shown), for instance, a variable-speed electric motor connected to drive shaft 20 of roller 16 and driving, by way of a small gearwheel 21 thereon and of an intermediate wheel 22, a large gearwheel 24 on drive shaft 23 of roller 18. In the embodiment shown the transmission ratio is about 1:8, the roller 16 running eight times as fast as the roller 18. The transmission ratio can vary considerably in dependence upon the kind of foil being processed and upon the required creping.

Between the two pairs of rollers the foil 14 rests on a preferably horizontal bearing or support surface 25. Two guide members 26 and 27 disposed above the surface 25 form guiding gaps therewith in alignment with the roll roller nips; the guiding gap formed by the guide member 26 near the first pair of rollers corresponds in height substantially to the thickness of the uncreped foil, whereas the gap formed by the guide member 27 corresponds in height substantially to the thickness of the creped foil.

Figure 3:
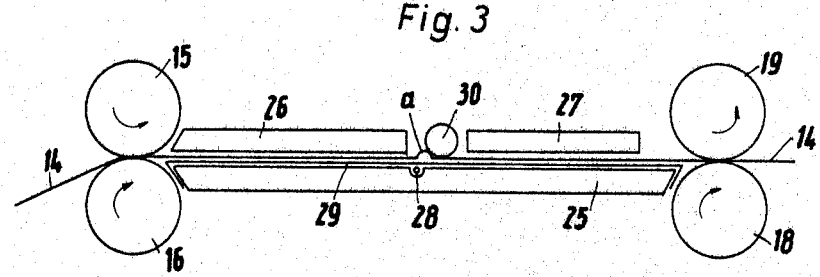
FIGURES 3–5 are schematic diagrams to show how the machine operates.
Figure 4:
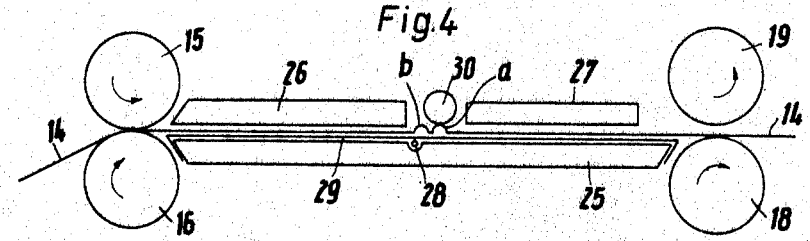
Figure 5:
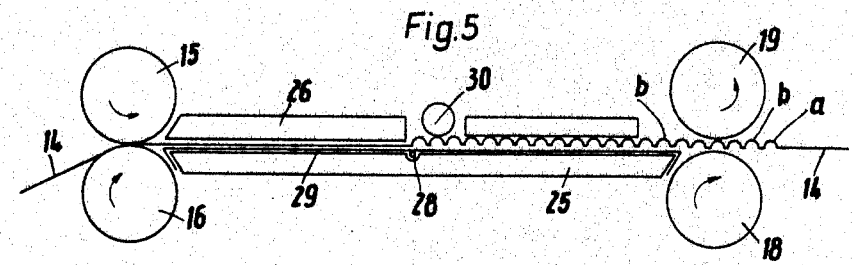

As can be gathered from FIGURES 3–5, where the two rollers pairs are, for the sake of clarity of illustration, further apart from one another than in the machine shown in FIGURE 1, a heating wire 28 is disposed between the two guiding members 26 and 27 in a groove in the preferably poorly conductive support surface 25, the groove extending parallel to the rollers. The heating wire 28 is tensioned by a spring in known manner. The supply wiring for the heating wire 28 is not shown. The groove is covered by a poorly conductive foil 29, e.g., a Teflon foil, which can extend over the whole area of the surface 25.

Figure 2:
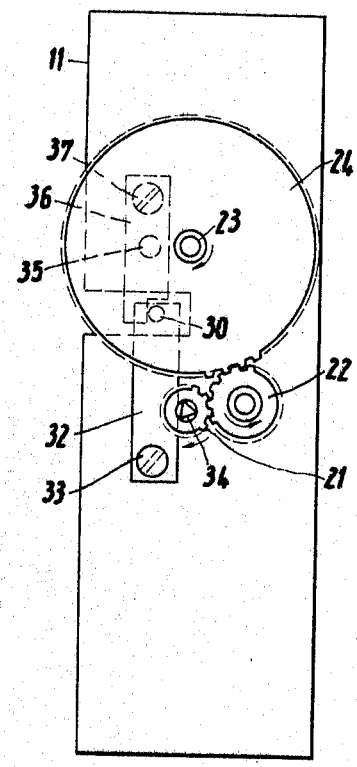
FIGURE 2 is a side view of the machine shown in FIGURE 1.

Directly adjacent the wire 28 as considered in the direction of movement of the foil 14, a round bar 30 extends parallel to the heating wire 28 and has both its ends secured to the free ends of levers 32 rotatable on pivots 33. FIGURES 1 and 2 show only that lever 32 which is disposed on the drive side of the machine. The latter lever rests on a cam 34 secured to the drive shaft 20 of the roller 16; consequently, the bar 30, which at the beginning of creping rests on the still flat foil is raised periodically. The cam 34 is so shaped that the raising of the bar 30 is preferably less than the height of the creping corrugations, so that the bar 30, having formed the first corrugation, can rest on the subsequent corrugations and retard the movement thereof. However, this is not an essential feature, since once the first corrugation has been formed further corrugations can be formed successively even without the bar 30 resting on the corrugations.

A shaft 35 of the roller 19 of the second roller pair is mounted on levers 36 rotatably mounted at their ends on pivots 37 on the frame side members 11. The free ends of the levers 36 rest on the bar 30, so that the levers 36 and therefore the roller 19 are raised whenever the cam 34 lifts the bar 30.

FIGURES 3-5 show the operation of the machine. The foil 14 coming off the reel 12 is preferably a plastics material having relatively little flexibility, such as hard PVC material; it is advanced by the first pair of rollers through the guiding gap between the surface 25 and the guide member 26 and over the energized heating wire 28, the leading foil end being engaged by the slow-running roller pair 18, 19. Since the foil is advancing, the strip-like foil part which is moving over and being heated by the heating wire 28 is softened and upset against the bar 30 resting on the foil and becomes a first corrugation $a$ (FIGURE 3).

When after the formation of the first corrugation $a$ the cam 34 has raised the bar 30 and the corrugation has passed on below the bar 30, this much more slowly moving corrugation $a$ causes formation of a directly contiguous second corrugation $b$ (FIGURE 4) from another strip-like foil part which is moving over and being softened by the wire 28 and which the first pair of rollers are advancing relatively fast. This is how further corrugations continue to be formed from the foil advancing over the wire 28; the creped foil emerging from the guiding gap between the guide member 27 and the surface 25 being engaged at the top by the raised roller 19.

In the machine described as an example, the periodic raising of the top roller 19 does not impair the action of the second roller pair, since the raising is controlled by the faster of the two rates of advance and occurs in a very rapid sequence and since the time intervals during which the roller 19 is in lowered position are much longer than the time intervals during which it is in its raised position. Also, as will be further explained hereinafter, the raising of the roller 19 is not very important.

The surprising novel effect provided by the method according to the invention can be achieved even in the absence of the guide member 27 and the second roller pair 18, 19. However, the presence of said members 27, 18, 19 makes for more uniform creping and provides improved variable control of the distances between individual corrugations. Consequently, in a machine of the kind described in which a second pair of rollers are provided, the top roller need not be controlled and can be preset to apply a desired conveying pressure to the creped foil.

The rod 30 may have a narrow or a relatively wide foil engaging surface. It could also be omitted altogether and its function taken over by the guide member 27 if the adjacent edge of said member 27 were suitably shaped and said member 27 were tiltably mounted. Other modifications are also feasible.

Figure 6:
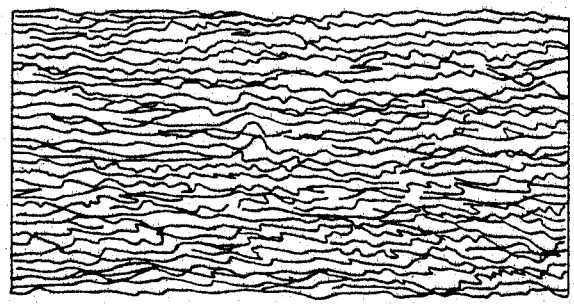
FIGURES 6 to 8 are plan views of various plastics foils which have been creped by the novel method.
Figure 7:
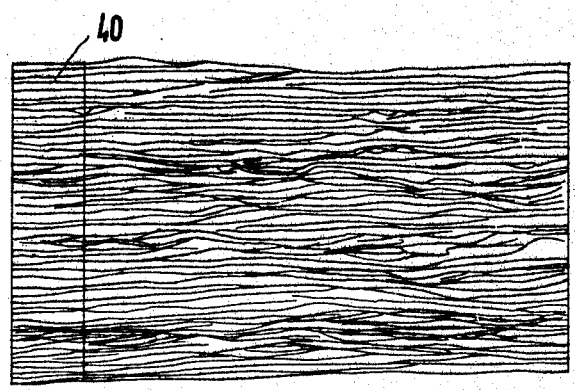
Figure 8:
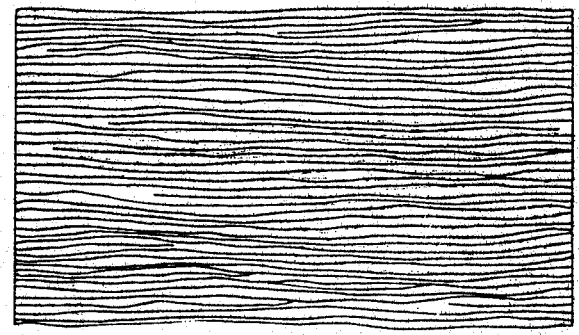

FIGURES 6 to 8 show various kinds of creping which can be produced by the method according to the invention.

FIGURE 6 shows an irregular creping which can be most readily produced with stretched foils which shrink considerably when heated.

FIGURE 7 shows a more uniform creping, the corrugations not being continuous. A braid 40 of a foil whose coloring is different but whose creping is similar may be welded to the edge of the main foil.

Other variations and modifications are feasible within the scope of the invention.

I claim:

1. A method of producing crinkly corrugations in a sheet of synthetic plastics material having a longitudinal dimension and a transverse dimension, comprising the steps of advancing said sheet continuously in the longitudinal direction in contact with a stationary support means, applying heat to consecutive transverse zones of said sheet as said zones pass a restricted transverse area of said stationary support means, thereby successively softening said sheet zones each of which has a width in the longitudinal direction of the sheet substantially corresponding to the width of one of said corrugations, reducing the rate of advancement of the portion of the sheet forwardly of said restricted transverse area by applying a localized braking action to the sheet along a transverse area thereof immediately forwardly of said restricted area thereby causing the sheet to buckle away from the support means in said area to form a transverse corrugation which sets upon cooling, and discontinuing said localized braking action while maintaining said reduced rate of advancement of said forwardly portion of the sheet so as to cause repetition of the buckling effect as each of said consecutive transverse zones of the sheet passes through said restricted transverse area.

References Cited

UNITED STATES PATENTS

| | | | |
|---|---|---|---|
| 2,263,712 | 11/1941 | Wrigley | 264—282 XR |
| 2,668,573 | 2/1954 | Larsson | 264—286 XR |
| 3,220,056 | 11/1965 | Walton | 18—19 |
| 3,235,933 | 2/1966 | Catallo | 264—282 XR |
| 3,390,218 | 6/1968 | Painter | 264—282 |
| 2,906,441 | 9/1959 | Leibeskind | 223—28 |

ROBERT F. WHITE, Primary Examiner

R. R. KUCIA, Assistant Examiner

U.S. Cl. X.R.

264—168, 286